(12) United States Patent
Hong (10) Patent No.: US 9,210,588 B2
(45) Date of Patent: Dec. 8, 2015

(54) APPARATUS AND METHOD FOR CONTROLLING OUTPUT OF BASE STATION IN MOBILE COMMUNICATION SYSTEM

(75) Inventor: Sungchul Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 13/584,013

(22) Filed: Aug. 13, 2012

(65) Prior Publication Data

US 2013/0040635 A1 Feb. 14, 2013

(30) Foreign Application Priority Data

Aug. 11, 2011 (KR) ........................ 10-2011-0079962

(51) Int. Cl.
*H04W 24/02* (2009.01)
*H04W 52/14* (2009.01)
*H04W 52/24* (2009.01)
*H04B 17/29* (2015.01)
*H04W 84/04* (2009.01)
*H04B 17/318* (2015.01)

(52) U.S. Cl.
CPC .............. *H04W 24/02* (2013.01); *H04B 17/29* (2013.01); *H04W 52/143* (2013.01); *H04W 52/244* (2013.01); *H04W 52/245* (2013.01); *H04B 17/318* (2013.01); *H04W 84/045* (2013.01)

(58) Field of Classification Search
CPC ............ H04W 52/244; H04W 84/045; H04W 52/245; H04W 52/143; H04W 52/16; H04W 52/325; H04W 52/08; H04W 52/146; H04W 52/247; H04W 52/267
USPC ........ 455/422.1, 452.2, 67.13, 134, 135, 161, 455/3, 115.3
See application file for complete search history.

(56) References Cited

U.S. PATENT DOCUMENTS

| 2006/0229025 | A1* | 10/2006 | Gandhi et al. | 455/69 |
| 2010/0136996 | A1* | 6/2010 | Han et al. | 455/452.1 |
| 2012/0046063 | A1* | 2/2012 | Chande et al. | 455/522 |

* cited by examiner

*Primary Examiner* — Charles Appiah
*Assistant Examiner* — Edward Zhang
(74) *Attorney, Agent, or Firm* — Jefferson IP Law, LLP (57) ABSTRACT

A method for controlling an output of a small base station in a mobile communication system is provided. The method includes measuring Received Signal Strength Indication (RSSI) and receive sensitivity of at least one of a macro base station and a neighboring small base station, determining a service margin of the small base station, and determining transmission power based on the RSSI, the receive sensitivity and the service margin. The method may further include extracting the receive sensitivity of the neighboring small base station from the measured receive sensitivity, calculating the RSSI of the macro base station from total RSSIs based on a receive sensitivity ratio of the neighboring small base stations prior to determining the service margin.

12 Claims, 7 Drawing Sheets

FIG. 7

APPARATUS AND METHOD FOR CONTROLLING OUTPUT OF BASE STATION IN MOBILE COMMUNICATION SYSTEM

PRIORITY

This application claims the benefit under 35 U.S.C. §119 (a) of a Korean patent application filed on Aug. 11, 2011 in the Korean Intellectual Property Office and assigned Serial No. 10-2011-0079962, the entire disclosure of which is hereby incorporated by reference.

BACKGROUND OF THE INVENTION

1. Field of the Invention

The present invention relates to an apparatus and a method for controlling an output of a base station in a mobile communication system. More particularly, the present invention relates to an apparatus and a method for controlling an output of a femto base station.

2. Description of the Related Art

In a macro base station device of a mobile communication system, an Element Management System (EMS) for controlling a base station device is installed in an operation station. During initial installation, an engineer directly determines a Radio Frequency (RF) environment through a field test in a field, and manually determines an output value of each base station device.

When an output of one base station during operation is controlled, the EMS controls neighboring base stations in a chain scheme. Unlike the macro base station, the femto base station is a base station which miniaturizes a mobile communication base station to be used within a user's home and reduces a cost of the base station to a level of a wireless Local Area Network (LAN) Access Point (AP). If the femto base station is commercialized, an existing portable phone may perform voice and data communication in the home at a low cost. Since the femto base station may have a small service radius and a user freely installs the femto base station, a plurality of femto cells may be installed in the macro base station.

Research is ongoing to automatically set output of Frequency Assignment (FA) of the femto base station, identification of a base station (Femto air Identifier; Pseudo-random Noise (PN) code in a case of Code Division Multiple Access (CDMA)). In a case of the output of the femto base station, there is an approach for determining an output of the femto base station based on Region Environment Report (RER) information of a terminal An approach using only RER information classifies the terminal into Home and Foreign terminals. During an initial operation, when the number of terminals is not sufficient, an output value is inaccurate. Further, during initial start, it takes a long time to obtain RER information of the terminal.

SUMMARY OF THE INVENTION

Aspects of the present invention are to address at least the above-mentioned problems and/or disadvantages and to provide at least the advantages described below. Accordingly, an aspect of the present is to provide a method for determining such that a terminal located from a femto base station by a predetermined distance is tuned to a femto base station through Over-The-Air-Rekeying (OTAR) by using an output of the femto base station as a reference of output information of a macro base station and a neighboring femto base station.

Another aspect of the present invention is to provide a method of delicately controlling an output of a base station using a Region Environment Report (RER) value of a terminal obtained during an operation of a femto base station and a method capable of solving a problem radiating an output of the femto base station with a maximum value due to interference between femto base stations.

In accordance with an aspect of the present invention, a method of controlling an output of a small base station in a mobile communication system is provided. The method includes measuring Received Signal Strength Indication (RSSI) and receive sensitivity of at least one of a macro base station and a neighboring small base station, determining a service margin of the small base station, and determining transmission power based on the RSSI, the receiving sensitivity and the service margin.

In accordance with an aspect of the present invention, a method of controlling an output of a small base station in a mobile communication system is provided. The method includes extracting the receive sensitivity of the neighboring small base station from the measured receive sensitivity, and calculating the RSSI of the macro base station from total RSSIs according to a receive sensitivity ratio of the neighboring small base stations prior to determining the service margin.

In accordance with another aspect of the present invention, a small base station for controlling an output in a mobile communication system is provided. The small base station includes a transceiver for exchanging a signal with at least one of a macro base station, a neighboring small base station, or a terminal, and a controller for measuring RSSI and receive sensitivity of at least one of a macro base station and a neighboring small base station, for determining a service margin of the small base station, and for determining transmission power based on the RSSI, the receive sensitivity and the service margin. The controller extracts the receive sensitivity of the neighboring small base station from the measured receive sensitivity, and calculates the RSSI of the macro base station from total RSSIs based on a receive sensitivity ratio of the neighboring small base stations.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Examples of a small base station include a pico cell base station, a femto cell base station, and a Home Node B (HeNB). The small base station may be an indoor installation type based station which can be installed in a home or an office. According to exemplary embodiments of the present invention, the small base station may be a femto cell base station; however, exemplary embodiments of the present invention are also applicable to other types of small base stations.

Although it is assumed that a mobile communication system according to an exemplary embodiment of the present invention is a Code Division Multiple Access (CDMA) system, exemplary embodiments the present invention may be applied to other mobile communication systems.

Figure 1:
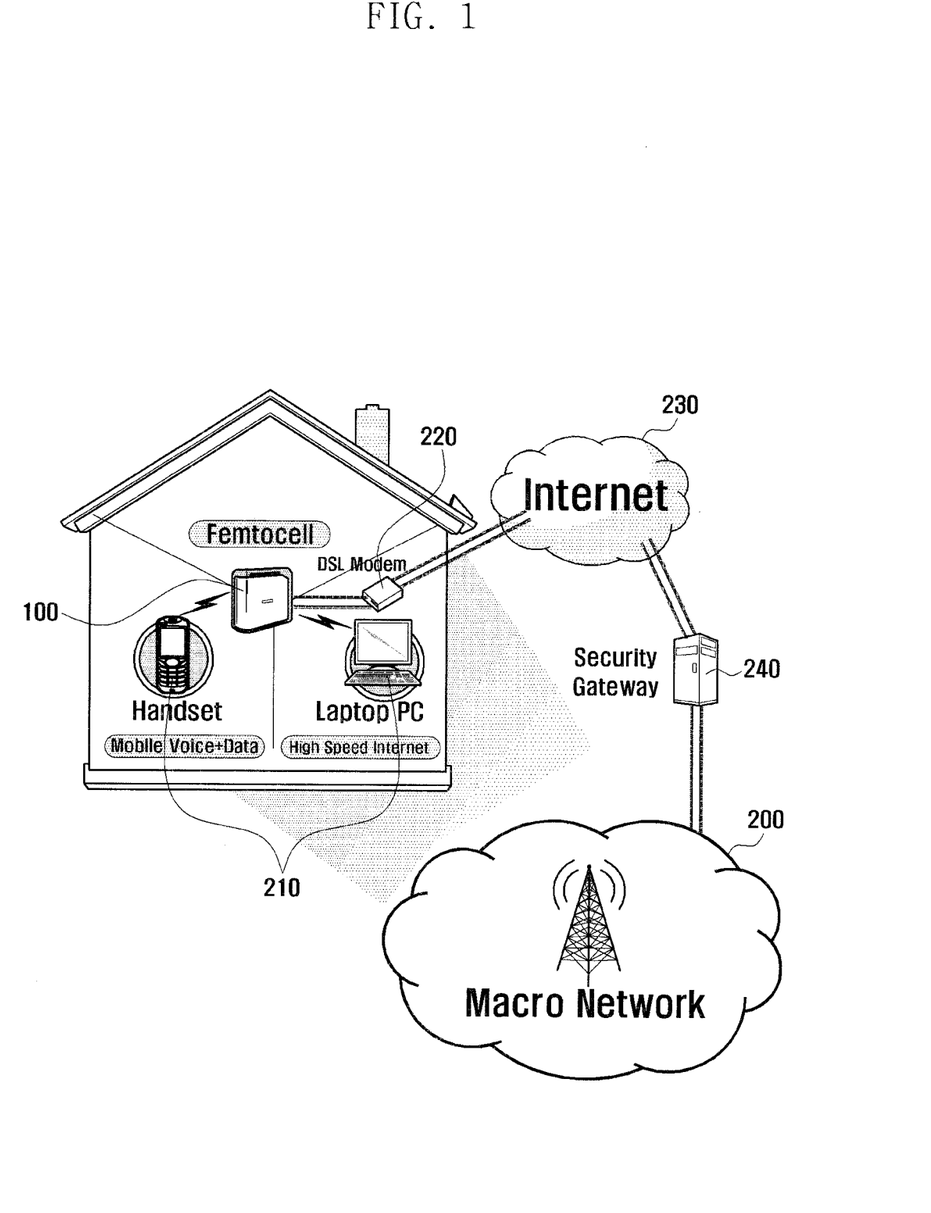
FIG. 1 is a diagram illustrating a configuration of a mobile communication system including a femto cell base station according to an exemplary embodiment of the present invention.

FIG. 1 is a diagram illustrating a configuration of a mobile communication system including a femtocell base station according to an exemplary embodiment of the present invention.

Referring to FIG. 1, a terminal 210 is connected to a femto base station 100 through a wireless access. The terminal 210 may include a portable terminal, a Personal Computer (PC), and a notebook computer such as a Personal Digital Assistant (PDA), and a smart phone as well as a mobile communication terminal.

The femto base station 100 refers to a small base station used in a home or an office. The femto base station 100 may be directly installed in a desired location by users. The femto base station 100 is connected to an Internet 230 through a modem 220, and is connected to a macro network 200 through a gateway 240. The femto base station 100 connects with a core network (macro network in FIG. 1) to provide a mobile communication service to the terminal 210.

Figure 2:
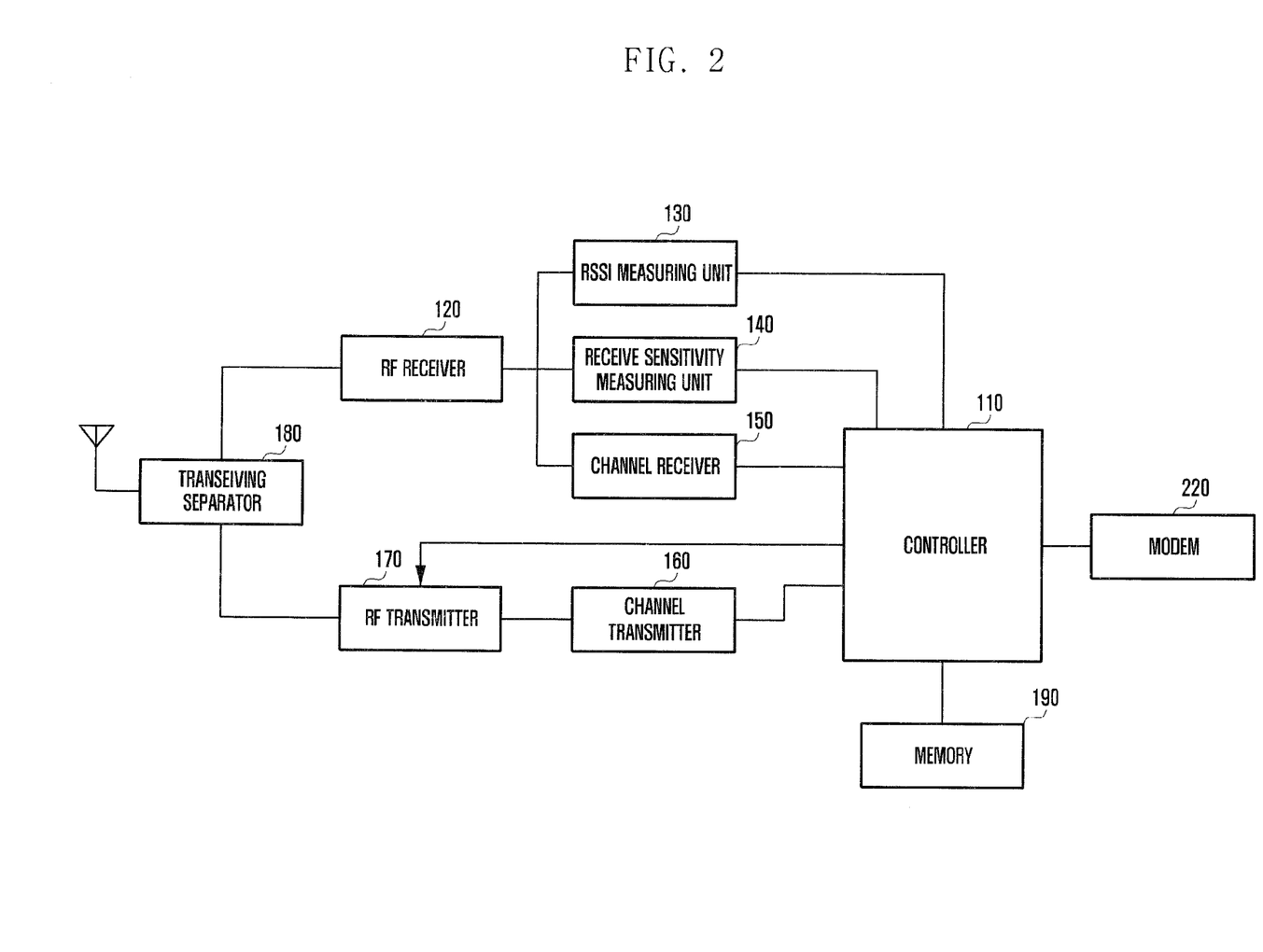
FIG. 2 is a block diagram illustrating a configuration of a femto base station according to an exemplary embodiment of the present invention.

FIG. 2 is a block diagram illustrating a configuration of a femto base station according to an exemplary embodiment of the present invention.

Referring to FIG. 2, a transceiving separator 180 separates a Radio Frequency (RF) signal of the femto base station 100. An RF receiver 120 low-noise-amplifies and down-converts a frequency of the amplified RF signal into a baseband signal.

A Received Signal Strength Indication (RSSI) measuring unit 130 measures a strength of a received signal outputted from the RF receiver 120.

A receive sensitivity measuring unit 140 measures a receive sensitivity of a signal received from the RF receiver 120. The receive sensitivity may be a signal-to-noise ratio, and the receive sensitivity measuring 140 may be a searcher for receiving a pilot channel signal in a CDMA communication system. The receive sensitivity may be a ratio of forward pilot channel power to total noise power (Ec/Io), and is used for a total receive sensitivity of a mobile terminal in a CDMA scheme mobile communication, and may be a reference of a wireless network design (determination of mobile communication cell interval). The channel receiver 150 receives signals of respective channels outputted from the RF receiver 120. For CDMA, the channel receiver 150 may be configured by receivers of an access channel, a control channel, and a data channel.

The memory 190 includes a program memory storing a program associated with an operation of a small base station and a program determining an output of a small base station according to an exemplary embodiment of the present invention. The memory 190 includes a data memory storing data generated during execution of a program. The data memory stores information such as a propagation loss, a penetrating loss, and a fading margin of a small base station associated with service coverage margin information of the small base station, as well as a gain of setting an output of the small base station according to an exemplary embodiment of the present invention.

The controller 110 controls an overall operation of the femto base station 100, and controls an output of the femto base station 100 using the RSSI and the received sensitivity signal according to an exemplary embodiment of the present invention.

A channel transmitter 160 generates transmission signals of respective channels of the femto base station 100. In the case of CDMA, the channel transmitter 160 may be configured by pilot channel, paging channel, control channel, and data channel transmitters. An output (namely, transmission power) of the RF transmitter 170 is controlled by the controller 110, the RF transmitter 170 frequency-up-converts an output of the channel transmitter 160 and converts the signal to an RF band of a transmission band, and outputs the converted RF signal to the transceiving separator 180 by controlling the transmission output under control of the controller 110.

FIG. 2 shows various blocks separately for convenience of description, but exemplary embodiments of the present invention are not limited thereto. For example, the RF transmitter 120 and the RF receiver 170 may include a transceiver for exchanging a signal with another neighboring base station and a terminal.

Similarly, one or more constituent elements other than the transceiver, such as the transceiving separator 180, the RFFI measuring unit 130, the receive sensitivity measuring unit 140, the channel receiver 150, and the channel transmitter 160 may be included in the controller 110.

A method of controlling an output of the femto base station 100 according to an exemplary embodiment of the present invention includes determining the output by the femto base station 100 in consideration of two aspects without intervention of an operator. A first method is a method of controlling an output of a femto base station 100 according to relation with a macro base station, and a second method is a method of excluding influence of a neighboring femto base station and controlling an output of the femto base station 100 according to relation with the macro base station. Hereinafter, it is assumed that the macro base station and the femto base station 100 are a base station of a CDMA scheme. As used herein, the terms 'base station' and 'cell' are used interchangeably.

A first method of controlling an output of the femto base station 100 is described below.

When an output of the femto base station 100 is determined, the output of the femto base station 100 should consider a case of needing cooperation with a macro base station service. When the femto base station 100 does not cooperate with the macro base station, namely, when a user registered in the macro base station does not use the femto base station 100, it is not necessary to determine an output of the femto base station 100 in consideration of the macro base station. However, when a user tuned to the macro base station is tuned to the femto base station 100, that is, when cooperation between the macro base station and the femto base station 100 is considered, the output of the femto base station 100 is determined considering the output of the macro base station.

Figure 3:
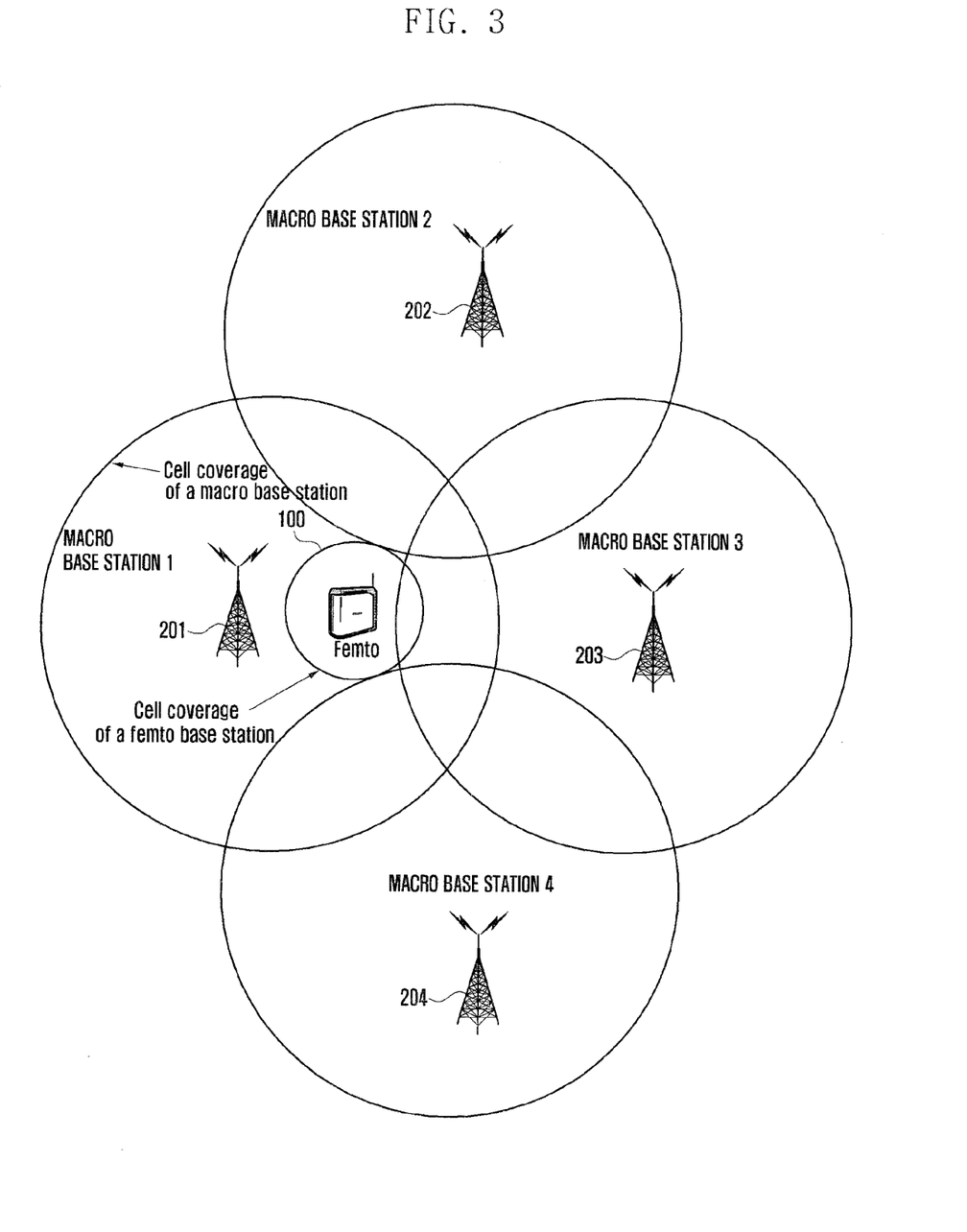
FIG. 3 is a diagram illustrating an example of a cell arrangement between a femto base station and a macro base station according to an exemplary embodiment of the present invention.

FIG. 3 is a diagram illustrating an example of a cell arrangement between a femto base station and a macro base station according to an exemplary embodiment of the present invention.

Referring to FIG. 3, the femto base station 100 may be located within a cell coverage of a certain serving macro base station 201, and may be affected by neighboring macro base stations 201 to 204.

In this case, the femto base station 100 should measure the output of the neighboring macro base stations 201 to 204 in a frequency band to be used in order to determine an output of the femto base station 100. The femto base station 100 measures the RSSI value measured in each frequency of neighboring base stations 201 to 204, and measures an Ec/Io value with respect to each Pseudo-random Noise (PN) code in a case of a CMDA system.

Accordingly, if the base station knows the measured RSSI value and the Ec/Io value with respect to each PN, the femto base station 100 may determine an output of a macro base station corresponding to each PN. The user may determine the receive power of each base station received in a location which the femto cell is installed, not an actual output of each base station.

Accordingly, the femto base station 100 measures RSSI of neighboring macro base stations 201 to 204 by the RSSI measuring unit 130, and measures Ec/Io by the receive sensitivity measuring unit 150. The controller 110 analyzes receive power from each macro base station using the measured RSSI and Ec/Io of macro base stations.

The macro base station is a system fixedly operated regardless of an output of the femto base station 100, and accordingly the femto base station 100 should determine an output based on an output of the macro base station. A terminal should determine an optimal output capable of communicating with the femto base station 100 in a service coverage area of the femto base station 100 based on a base station (such as the macro base station 201 of FIG. 3) having the greatest Ec/Io of the measured macro base stations.

The Ec/Io of the femto base station 100 is set to be greater than Ec/Io of the macro base station based on a base station having the greatest Ec/Io. A terminal registered in the femto base station 100 may communicate with the macro base station through the femto base station 100.

When the terminal is located within a service coverage area of the femto base station 100, the terminal handovers from the macro base station to the femto base station 100 and performs a communication function through the femto base station 100. Accordingly, an output of the femto base station 100 should be greater than an output of the macro base station within the femto service coverage area. It is assumed in an exemplary embodiment of the present invention that Ec/Io of the femto base station 100 is set to be twice greater than that of a macro base station having the greatest Ec/Io.

The reason to determine an output of the femto base station 100 based on a macro base station having the greatest Ec/Io is that a terminal is tuned to a macro base station having the greatest Ec/Io. The femto base station 100 generates a signal twice that of a signal received from the macro base station in order to tune neighboring terminals to the femto base station 100 in a location which the femto base station 100 is installed.

Accordingly, the controller 110 may determine an output of the femto base station 100 using RSSIs and Ec/Io values of the macro base stations. In this case, Required Power (RP) of the femto base station 100 may be an output (transmission power) of the femto base station 100, and may be determined by Equation 1.

$$\text{Required power (RP)} = \text{Macro RSSI} + \text{Macro } Ec/Io + 3\text{ dB} + \text{Serving area margin} \quad \text{[Equation 1]}$$

In Equation 1, 3 dB is a value to cause an output signal of the femto base station 100 to become twice that of a macro base station. Accordingly, the RP is a value required for a signal of the femto base station 100 to be greater than that of the macro base station by 3dB in an antenna location of the femto base station 100.

To serve a terminal existing within a predetermined distance from the femto base station 100, the femto base station 100 should consider a value corresponding to a service area margin. The service area margin should consider a propagation loss of a femto base station signal and a penetration loss according to an obstacle (e.g., wall) based on a distance which the femto base station 100 should essentially serve. A fading margin of the femto base station 100 should be additionally considered. In this case, the service area margin may be expressed by Equation 2. Accordingly, when determining an output of the femto base station 100, the controller 110 should consider situations in the femto base station 100 as Equation 2.

$$\text{Service area margin} = \text{propagation loss} + \text{penetration loss} + \text{fading margin} \quad \text{[Equation 2]}$$

For example, when an intensity of a pilot signal of a macro base station measured by the femto base station 100 is −80 dBm, an intensity of a pilot signal of the femto base station 100 should be −77 dBm which is greater than the intensity of a pilot signal of a macro base station by 3 dB. A corresponding value should be added to the service area margin as illustrated in Equation 2.

The propagation loss, the penetration loss, and the fading margin may be based on an experimentally measured result, and the controller 110 may determine the service area margin using preset values when determining the output of the femto base station 100.

For example, a propagation loss in a frequency of 1.9 GHz is 74 dB based on 10 m, and the penetration loss is 6 dB corresponding to 1 wall, and the fading margin is about 3 dB. When the femto base station 100 determines an output of about 6 dBm, a terminal existing within about 10 m from the femto base station 100 is tuned to the femto base station 100 in a corresponding zone.

In an exemplary embodiment of the present invention, information with respect to respective parameters of Equation 1 and Equation 2 is stored in the memory 190, and the controller 110 uses information stored in the memory 190 when determining an output of a small base station. The memory 190 stores gain information (3 dB in Equation 1) to have a transmission output twice greater than the macro base station in a service coverage area of the small base station. The memory 190 may also store service coverage margin information as illustrated in Equation 2.

Loss values corresponding to a radius of a service coverage area of a small base station are experimentally measured and stored as the propagation loss information. A service coverage area of the small base station is set to have the size of about 10 m. Accordingly, propagation losses in a service coverage area of 10 m radius are experimentally measured, and an average thereof is computed and stored as the propagation loss information. When setting a service coverage area of the small base station in an exemplary embodiment of the present invention, the service coverage area may be controlled according to a response of the terminal located within the service coverage area. Accordingly, in this case, an upper limit distance (e.g., 15 m) and a lower limit distance (5m) of the service coverage area are set, and a corresponding propagation loss within the distances may be measured and stored.

A penetration loss is experimentally measured and stored in a type of an obstacle existing within a service coverage area of the small base station as the penetration loss information. The obstacles may include glass, concrete, wood, steel, and a combination thereof, such as glass+concrete, concrete+steel+tile, or steel+glass. Accordingly, after measuring a penetrating loss according the foregoing obstacle material, penetrating loss values measured by obstacle materials are stored in the memory 190. The fading margin is based on experimentally measured data and is stored in the memory 190.

However, an output (power) obtained through an Over-The-Air-Rekeying (OTAR) may cause a problem which does not meet an actual installation environment. This is because perfect data cannot be included according to a thickness or a form of an obstacle (perfect wall, partition, window) and a fading margin cannot be expected although an actual femto base station stores data according to the number or materials of obstacles such as an actual wall in an installed environment (building or house).

Accordingly, a range of an output value is determined as a range in a scheme obtaining an output (e.g., RP) of the femto base station 100. For example, 10 m information may be a service area target. However, when determining a service coverage area of the femto base station 100, the controller 110 of the femto base station 100 may set an upper limit service coverage area and a lower limit service coverage area, and set an upper limit output (MAX power) and a lower limit output (MIN power) in a corresponding service coverage area.

Figure 4:
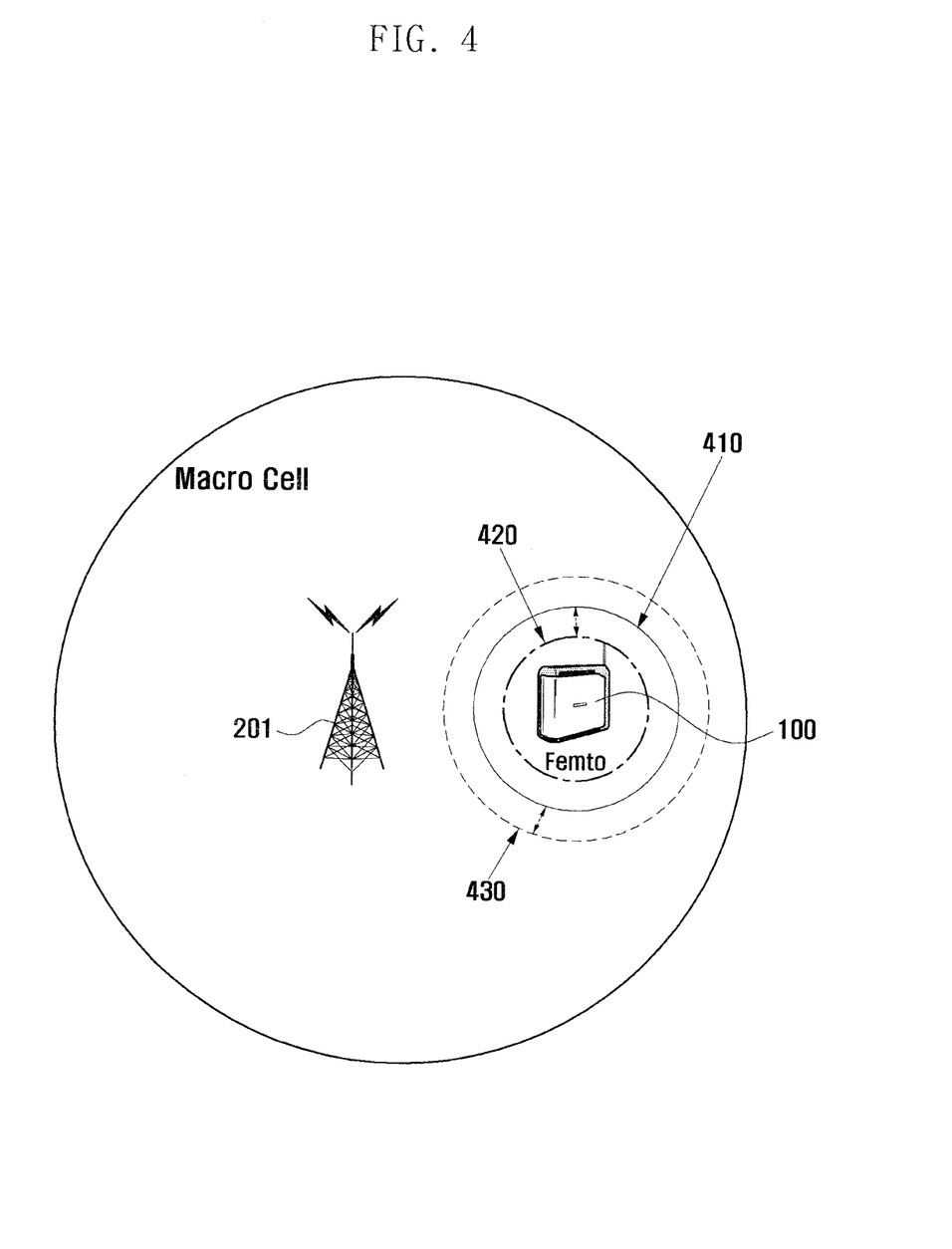
FIG. 4 is a diagram illustrating an example of a configuration of upper limit and lower limit service coverage areas in a femto base station according to an exemplary embodiment of the present invention.

FIG. 4 is a diagram illustrating an example of a configuration of upper limit and lower limit service coverage areas in a femto base station according to an exemplary embodiment of the present invention.

Referring to FIG. 4, FIG. 4 the upper limit service coverage area 430 and the lower limit service coverage area 420 are further set after an appropriate service coverage area 410 of the femto base station 100 is set. For example, when the appropriate service coverage area 410 is set to 10 m, MAX power and MIN power corresponding to a service coverage area of the smallest 5 m (lower limit service coverage area 420) and the largest 15 m (upper limit service coverage area 430) are obtained.

A reason why the power has a minimum value MIN and a maximum value MAX is because the power by the OTAR reflects RER results collected in a dynamic ARF procedure for determination of the power by the OTAR.

Accordingly, when installing the femto base station 100, the controller 110 obtains an output of the femto base station 100 in the method of Equation 1, and may simultaneously obtain the upper limit output MAX power and the lower limit output MIN power in this case.

The controller 110 determines an output of the femto base station 100 as the MAX power in an initial ARF, and controls the output of the femto base station 100 according to the collected RER information of the terminal hereafter, and reduces the output of the femto base station 100 to the MIN power according to the collected RER of the terminal.

Figure 5:
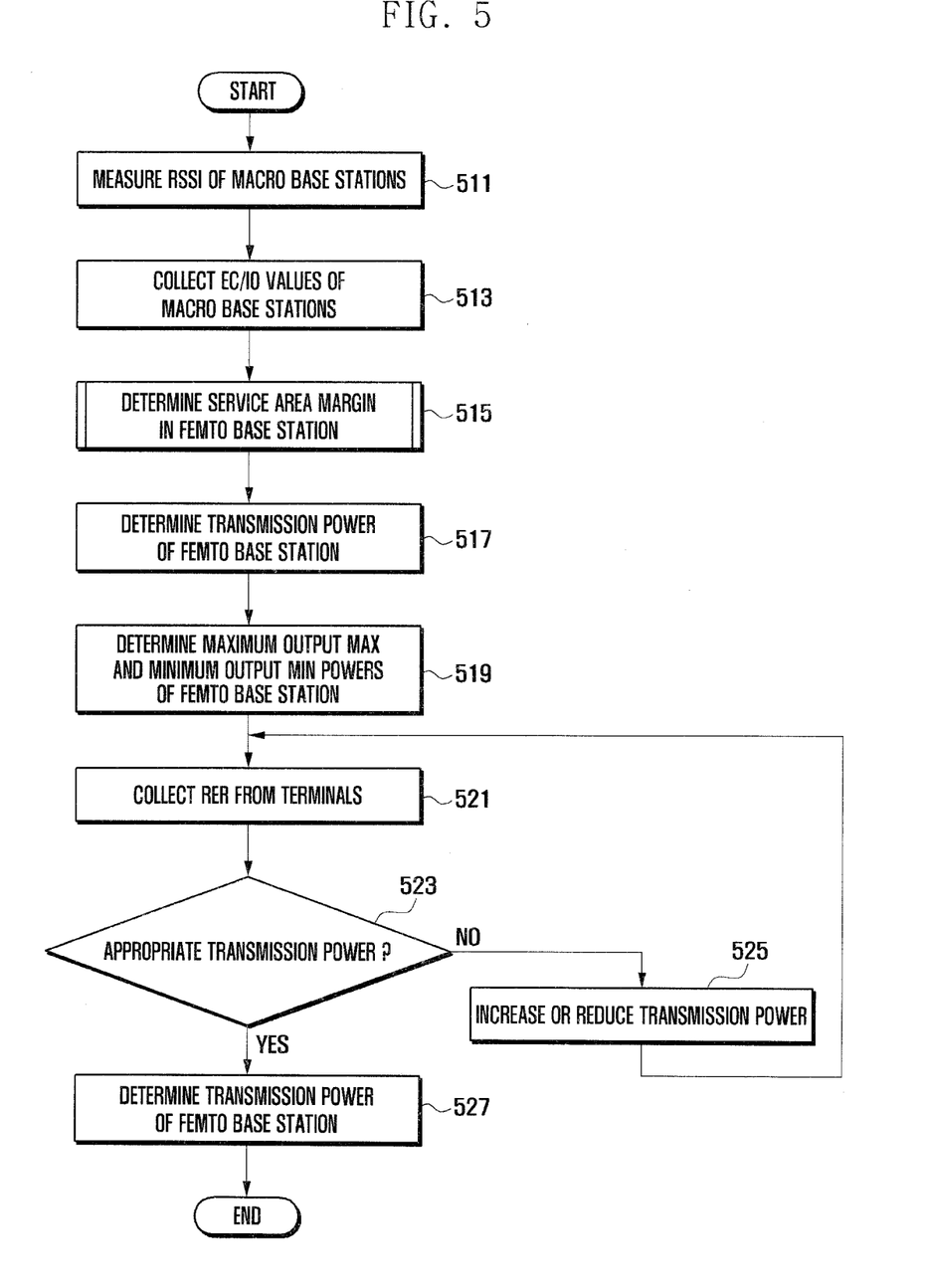
FIG. 5 is a flowchart illustrating a method for controlling an output of a femto base station according to a first exemplary embodiment of the present invention.

FIG. 5 is a flowchart illustrating a method for controlling an output of a femto base station according to a first exemplary embodiment of the present invention.

Referring to FIG. 5, the controller 110 collects RSSIs of signals received from a serving macro base station 201 and neighboring macro base stations 202 to 204 through an RSSI measuring unit 130 in step 511, and collects Ec/Io values of the macro base stations 201 to 204 measured by a receive sensitivity measuring unit 140 in step 513. The controller 110 analyzes the Ec/Io values to select a macro base station having the greatest Ec/Io. In the example shown in FIG. 3, the macro base station 201 may be selected. The controller 110 analyzes a received signal of the selected macro base station to set an output of the femto base station 100 to having a value greater than that of the selected macro base station.

When an output of the femto base station 100 is set to be twice that of the macro base station, the set value may be 3 dB as illustrated in Equation 1.

The controller 110 performs calculation of Equation 2 to determine a service area margin in an environment which the femto base station 100 will be installed in step 515 Examples of a variable for determining the service area margin include a propagation Loss, a penetration Loss, and a fading Margin as described above as.

The propagation loss may be determined as a value set according to a cell coverage of the femto base station 100. The service coverage area is typically set to about 10 m. According to an exemplary embodiment of the present invention, an output of the femto base station 100 is determined using set propagation loss values of an upper limit service coverage area 15 m and a lower limit service coverage area 5 m. In this case, the respective output of the femto base station 100 for service coverage areas of 15 m, 10 m, and 5 m may be determined.

The penetration loss may be determined according to an obstacle (wall, etc.) in an installed environment and materials (glass, concrete, tree, etc.) of the obstacle. In this case, a preset penetration loss may be used according to a type and a material of the obstacle, and a total penetration loss value may be determined according to the number of obstacles. Further, the fading margin may use a value set according to an experimental measurement.

As described above, after determining a value with respect to a service area margin of the femto base station 100, the controller 110 may perform calculation of Equation 1 to determine an output (transmission power) of the femto base station 100 in step 517. In this case, an output value in the service coverage area or output values of upper limit and lower limit service coverage areas may be obtained as the transmission power of the femto base station 100. The controller 110 may collect RER of a terminal to determine an appropriate output of the femto base station 100. After communicating with terminals using an output an appropriate service coverage area (e.g., 10 m), the controller 100 may collect RER of the terminal to determine an appropriate output of the femto base station 100 while increasing/reducing the output of the femto base station 100. The controller 110 may communicate with terminals using an upper limit service coverage area (e.g., 15 m), and collect RER of the terminals to determine the appropriate output of the femto base station 100 while reducing the output of the femto base station 100. The controller 110 may communicate with terminals using a lower limit service coverage area (e.g., 5 m), and collect RER of the terminals to determine the appropriate output of the femto base station 100 while increasing the output of the femto base station 100.

According to an exemplary embodiment of the present invention, output of the femto base station 100 is determined using a maximum output MAX power of a service coverage area. In this case, the controller 110 determines a maximum output MAX power and a minimum output MIN power of the femto base station 100 at step 519.

The controller 110 attempts communication with a terminal with the maximum output MAX power. The controller 110 collects RER from the terminals in step 521, and determines whether a current output (transmission power) of the femto base station 100 is an appropriate level in step 523. In this case, the femto base station 100 may receive signals of a home subscriber and a foreign subscriber. When the output of the femto base station 100 is equal to or greater than an appropriate level, the femto base station 100 may excessively receive RER information from foreign subscribers. When the output of the femto base station 100 is less than the appropriate level, a communication environment with the home subscriber is deteriorated. Accordingly, the controller 110 should determine an output of an appropriate level capable of easily communicating with the home subscriber while limiting communication with foreign subscribers to the utmost at step 523.

When the output of the femto base station 100 is not appropriate in step 523, the controller 110 increases or reduces transmission power of the femto base station 100 while controlling the RF transmitter 170 to a preset size in step 525. When the RER information of the foreign terminal is excessively received, the controller 110 determines that a service coverage area of the femto base station 100 is excessively large, and reduces the output of the femto base station 100 in step 525.

When the output of the femto base station 100 is set to an appropriate level by repeating steps 521 to 525, the controller 110 detects the output level and step 523, and controls an output of the femto base station 100 with the preset level in step 527.

As described above, after determining the output of the femto base station 100, the femto base station 100 serves a communication function with terminals in the femto base station 100 with the determined output level. The controller 110 controls the femto base station 100 to have an output of an appropriate level by periodically performing steps 521 to 527. When there is no call, the output of the femto base station 100 may be performed at each preset time. For example, the preset time period may be set to once per day and an execution time may be set to midnight.

Second, an approach should be considered that a neighboring femto base station avoids interference with neighboring femto base stations and secures a cell service coverage area thereof. To provide a suitable service coverage area to a user to be tuned to the femto base station 100, the femto base station 100 should determine an output of a base station without being affected by an output of the neighboring base station. However, in this case, the output of neighboring base stations continuously interfere with each other so that the neighboring base stations radiate each maximum output value.

Figure 6:
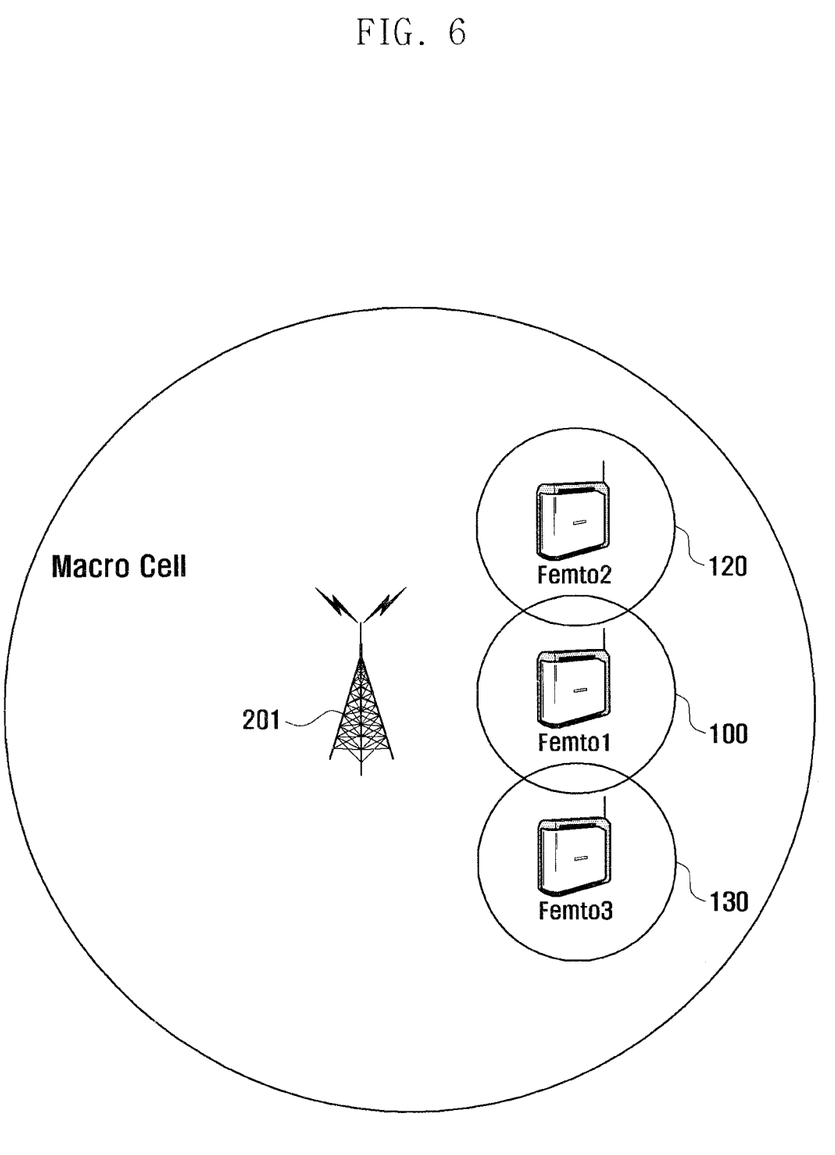
FIG. 6 is a diagram illustrating an example which a plurality of femto base stations are installed in a service coverage area of a macro base station according to an exemplary embodiment of the present invention.

FIG. 6 is a diagram illustrating an example which a plurality of femto base stations are installed in a service coverage area of a macro base station according to an exemplary embodiment of the present invention.

Referring to FIG. 6, where a femto base station 100 is installed together with femto base stations 120 and 130, the output of the neighboring femto base stations 120 and 130 may influence the femto base station 100 when the femto base station 100 determines the output of the base station. In this case, as in the relation with the macro base stations 201-204, when the output is controlled to doubly secure Ec/Io based on the output a neighboring femto cell, the femto base may alternately and continuously increase the output.

To exclude interference between femto base stations, exemplary embodiments of the present invention determine the output of the femto base station 100 in consideration of only interference with a macro base station and disregard signals of the neighboring femto base stations.

Each femto base station extracts signals of neighboring femto base stations from signals of base stations received from a service coverage area (e.g., coverage of about 10 m) set in a point in which each femto base station is located, determines a ratio of the extracted signals of the neighboring femto base stations, removes the ratio of the extracted signals from total received signals of the base stations to compute only a signal of a macro base station, and determines an output of the femto base station in consideration of the computed signal of the macro base station.

The femto base station 100 determines power by Frequency Assignments (Fas) using RSSI values measured by FAs and Ec/Io values by base stations during OTAR. An RSSI signal measured during the OTAR is classified into signals received by macro base stations, signals and noise received by neighboring femto base stations. Accordingly, the RSSI received by the femto base station 100 may be expressed by Equation 3. According to an exemplary embodiment of the present invention, a received RSSI by a neighboring femto base station is removed as illustrated in Equation 4 from total RSSIs, and an output of the femto base station 100 is determined using a received signal from which interference between neighboring femto base stations is removed.

Total RSSIs=sum of RSSIs of macro base stations+
    sum of RSSIs of neighboring femto cells+noise    [Equation 3]

Sum of RSSIs of macro base stations+noise=total
    RSSIs−sum of RSSIs of neighboring femto base
    stations    [Equation 4]

The femto base station 100 identifies a signal component other than a signal of a neighboring femto base station among the total RSSI signals measured as illustrated in Equation 4. The femto base station 100 uses the measured size of the RSSI signal as Echo values by base stations measured together with the RSSI signal. For example, if the RSSI value and the Echo value of the macro base station measured through the OTAR are −80 dBm and −6 dB, respectively, a pilot signal of the macro base station has −86 dBm. The −80 dBm becomes 0.00000001 mW, and the −86 dBm becomes 0.0000000025 mW. In this case, a portion of power becomes $10^{((RSSI-Ec/Io)/10)}/10^{(Ec/Io/10)}$.

When using the Ec/Io values by base stations measured in the foregoing method, a ratio of an RSSI received by the macro base station to RSSI values received by femto base stations may be obtained.

Table 1 below illustrates an example of obtaining a portion of power of received signals by base stations using the Ec/Io by the femto base station 100. Table 1 shows an example with three macro base stations and one neighboring femto base station. After obtaining total RSSI signals, when obtaining an Ec/Io value of each base station as illustrated in Table 1, a portion of power outputted from a corresponding base station may be obtained.

TABLE 1

Ec/Io For Macro 1: −6 dB ==> portion of power = 0.25
Ec/Io For Macro 2: −8 dB ==> portion of power = 0.15
Ec/Io For Macro 3: −7 dB ==> portion of power = 0.2
Ec/Io For Femto 1: −5 dB ==> portion of power = 0.3
noise ==> portion of power = 0.1

After obtaining a portion of the power of respective base stations (including macro base stations and femto base stations) as illustrated in Table 1, power of a received signal of the macro base station may be obtained by subtracting a portion of the power of the femto base stations from a total portion of power. In this case, as illustrated in Equation 4, a noise component is included in a signal of a macro base station. In the example of table 1, it will be understood that a signal of a macro base station received by the femto base station 100 becomes 70% of the whole signal.

For example, if the total RSSI value is −80 dBm, power is 0.00000001 mW. 0.000000007 mW (i.e., 70% of the power) may be determined to be a signal received from an actual macro base station. Accordingly, −81.55 dBm is determined as a sum of outputs of macro base stations such that an output of the femto base station 100 may be obtained.

Figure 7:
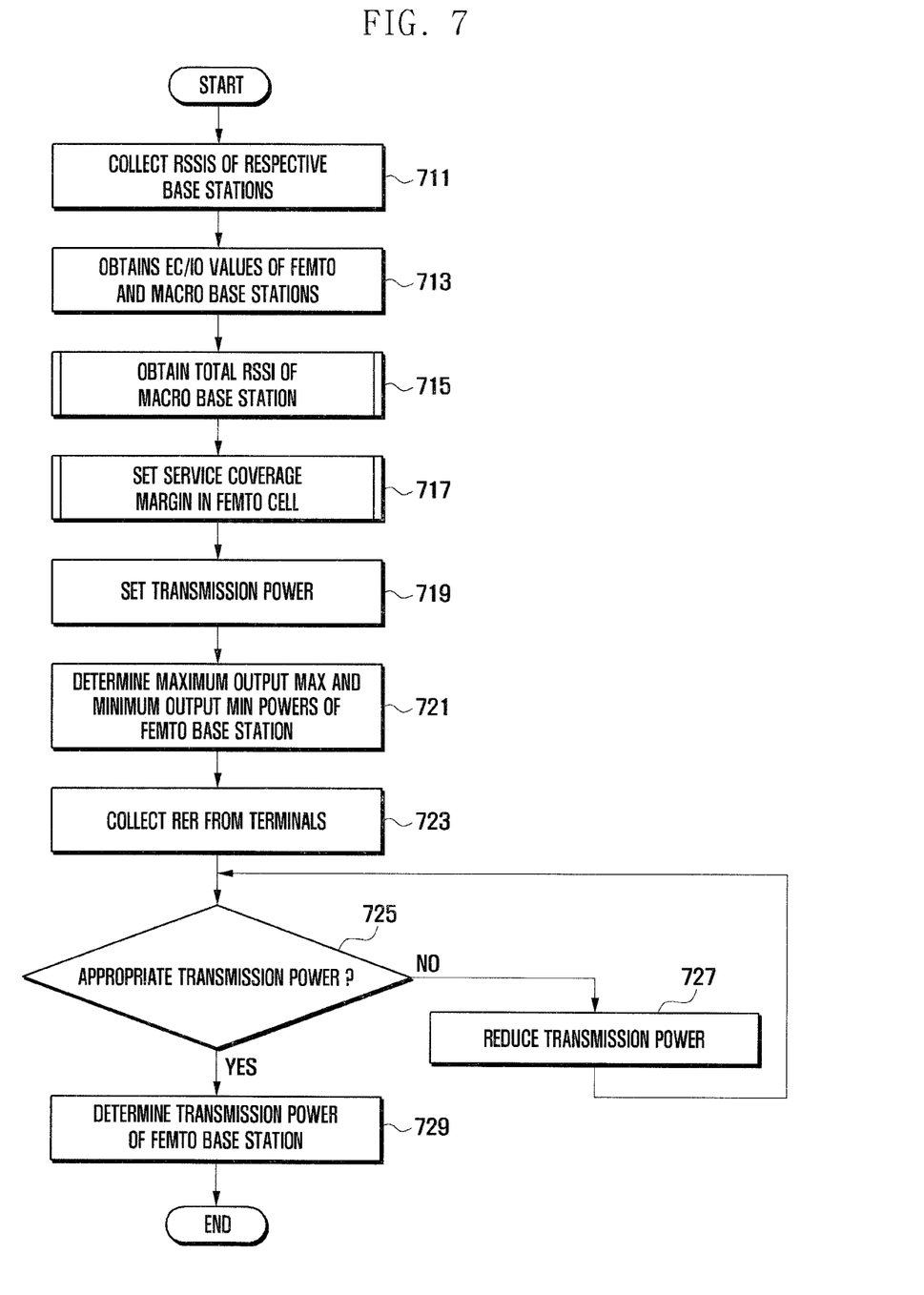
FIG. 7 is a flowchart illustrating a method for determining an output from a femto base station according to an exemplary embodiment of the present invention.

FIG. 7 is a flowchart illustrating a method for determining an output from a femto base station according to an exemplary embodiment of the present invention.

Referring to FIG. 7, the controller 110 collects RSSIs received from respective base stations through an RSSI measuring unit 130 to obtain a total RSSI in step 711. The controller 110 collects Ec/Io values of respective base stations through a receive sensitivity measuring unit 140.

Since the macro base station and the femto base station 100 use different system information, the femto base station 100 may identify a PN code of a received signal. The PN code may be divided into a PN code for a macro base station and a PN code for a femto base station. Accordingly, the controller 110 classifies femto base stations and macro base stations and obtains Ec/Io values thereof.

The controller 110 may obtain a total RSSI of a macro base station using Equation 3 and Equation 4 in step 715. The controller 110 obtains a power ratio of signals received by respective base stations according to Echo values of the respective base stations obtained at step 713, and calculates an RSSI achieved by subtracting a portion of power of signals received from the femto base stations from total received power. The controller 110 obtains a received signal of a macro base station from which interferences outputted from neighboring femto base stations are removed.

The controller 110 performs steps 717 to 729 in a similar manner as in steps 515 to 527 of FIG. 5 to determine an output of the femto base station 100. The controller 110 determines a service coverage margin of the small base station.

When determining the service coverage margin, the controller 110 determines a service coverage distance in the small base station, accesses a propagation loss value set according to the determined service coverage distance, accesses corresponding penetration loss values to the memory 190 according to the number and types of obstacles in the service coverage area to calculate a penetration loss in the service coverage area, accesses a fading margin set to the memory 190, and determines a service margin in using Equation 2.

The service coverage distance may be 10 m, and the service coverage margin may be set to a propagation loss, a penetration loss, and a fading margin in a service coverage area of a 10 m radius in the small base station. The controller 110 determines an output of a femto base station to have an upper limit output and a lower limit output of a service coverage area in the small base station, and the controller 100 may collect RER information of a terminal to control an output in the service coverage area.

The controller 110 communicates with terminals with a preset output, collects RER information from the terminals, and analyzes the collected RER information to determine an output of a small base station as a value between the upper limit output and the lower limit output while repeating a procedure of controlling a transmission output.

In a method according to an exemplary embodiment of the present invention, when a plurality of femto base stations are operated, a base station automatically determines an output, an operator may lessen a burden of a work for automatically setting an output value with respect to a separate base station. Accordingly, there is no need for a field test for searching optimal values by base stations, and an effect of reducing a cost may be obtained. In a femto base station according to an exemplary embodiment of the present invention, the femto base station determines an output (power) by itself and a plurality of femto cell devices may be maintained/operated without specific management. Accordingly, the present invention can reduce Operating expenditure (Opex) and Capex Capital expenditures (Capex) of the femto cell device.

A terminal tuned to the femto cell maintains a sufficient received power level in a predetermined radius of the femto cell, so that call quality of a femto cell user is improved and influence of an output of the femto cell to a macro base station is minimized to reduce call quality reduction with a macro base station user. Since interference between femto base stations is disregarded, when the femto base stations are located close to influence each other, a maximum output value is not employed.

While the invention has been shown and described with reference to certain exemplary embodiments thereof, it will be clearly by those skilled in the art that various changes in form and details may be made therein without departing from the spirit and scope of the present invention as defined in the appended claims and their equivalents.

What is claimed is:

1. A method for controlling an output of a small base station in a mobile communication system, comprising:

measuring Received Signal Strength Indication (RSSI) of a macro base station and a neighboring small base station;

measuring receiving sensitivity including Ec/Io of the macro base station and the neighboring small base station;

analyzing the receiving sensitivity including Ec/Io of the neighboring small base station to calculate an RSSI ratio of the neighboring small base station from measured total RSSIs;

calculating the RSSI of the macro base station to the measured total RSSIs based on the RSSI ratio of the neighboring small base station;

determining a service margin of a small base station; and determining transmission power using the calculated RSSI of the macro base station, the receiving sensitivity of the macro base station and the service margin.

2. The method of claim 1, wherein the determining of the service margin of a small base station comprises:
- determining propagation loss according to a service coverage distance of the small base station;
- determining penetration loss according to the number or types of obstacles in the service coverage;
- determining a fading margin; and
- determining the service margin using the propagation loss, the penetration loss, and the fading margin.

3. The method of claim 2, wherein the determining of the service margin comprises setting the service coverage distance to 10m; and applying the propagation loss, the penetration loss, and the fading margin to determine the service margin.

4. The method of claim 3, wherein the determining of the transmission power comprises:
- determining a gain setting such that the transmission power has a value greater than power of a signal received from the macro base station; and
- determining the power transmission using the RSSI, the receiving sensitivity, the service margin, and the gain.

5. The method of claim 4, wherein the determining of the gain comprises setting the gain such the the transmission power has a double of power received from the macro base station.

6. The method of claim 5, further comprising
- communicating with terminals in the small base station using the determined transmission power to receive REP information from the terminals; and
- controlling the transmission power using the PER information,
- after the determining of the transmission power.

7. A small base station for controlling an output in a mobile communication system, comprising:
- a transceiver for exchanging a signal with a macro base station, a neighboring small base station, or terminals; and
- a controller for:
    - measuring Received Signal Strength Indication (RSSI) of the macro base station and a neighboring small base station,
    - measuring receiving sensitivity including Ec/Io of the macro base station and the neighboring small base station,
    - analyzing the receiving sensitivity including Ec/Io of the neighboring small base station to calculate an RSSI ratio of the neighboring small base station from measured total RSSIs,
    - calculating the RSSI of the macro base station to the measured total RSSIs based on the RSSI ratio of the neighboring small base station,
    - determining a service margin of a small base station, and
    - determining transmission power using the calculated RSSI of the macro base station, the receiving sensitivity of the macro base station and the service margin.

8. The small base station of claim 7, wherein the controller determines propagation loss according to a service coverage distance of the small base station, determines penetration loss according to the number or types of obstacles in the service coverage; determines a fading margin, and determines the service margin using the propagation loss, the penetration loss, and the fading margin.

9. The small base station of claim 8, wherein the controller sets the service coverage distance to 10m, and applies the propagation loss, the penetration loss, and the fading margin to determine the service margin.

10. The small base station of claim 9, wherein the controller determines a gain setting such that the transmission power has a value greater than power of a signal received from the macro base station; and determines the power transmission using the RSSI, the receiving sensitivity, the service margin, and the gain.

11. The small base station of claim 10, wherein the controller sets the gain such the the transmission power has a double of power received from the macro base station.

12. The method of claim 11, wherein the controller communicates with terminals in the small base station using the determined transmission power to receive REP information from the terminals, and controls the transmission power using the PER information.

* * * * *